R. RUEMELIN.
TRACTOR.
APPLICATION FILED NOV. 9, 1914.

1,208,381. Patented Dec. 12, 1916.
5 SHEETS—SHEET 1.

INVENTOR
RICHARD RUEMELIN
BY
Paul & Paul
ATTORNEYS

R. RUEMELIN.
TRACTOR.
APPLICATION FILED NOV. 9, 1914.

1,208,381.

Patented Dec. 12, 1916.
5 SHEETS—SHEET 2.

WITNESSES
M. P. McInnis
E. A. Paul

INVENTOR
RICHARD RUEMELIN
BY Paul & Paul
ATTORNEYS

R. RUEMELIN.
TRACTOR.
APPLICATION FILED NOV. 9, 1914.

1,208,381.

Patented Dec. 12, 1916.
5 SHEETS—SHEET 4.

WITNESSES

INVENTOR
RICHARD RUEMELIN
BY
Paul & Paul
ATTORNEYS

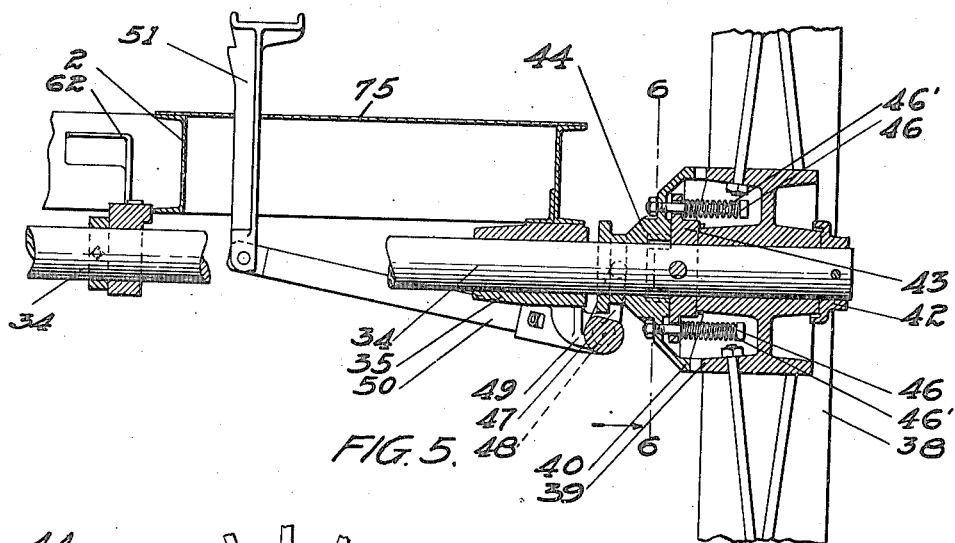
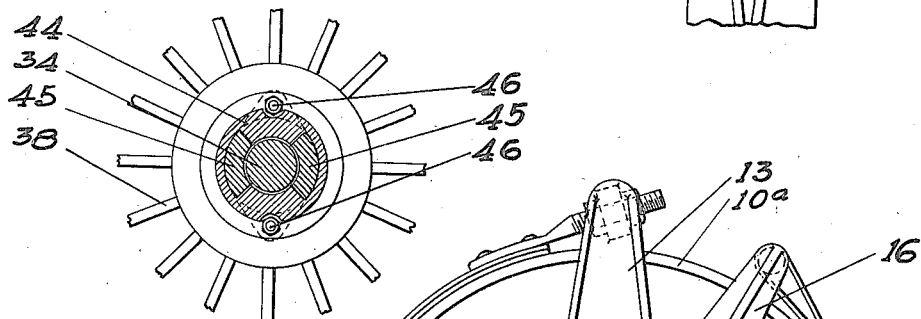
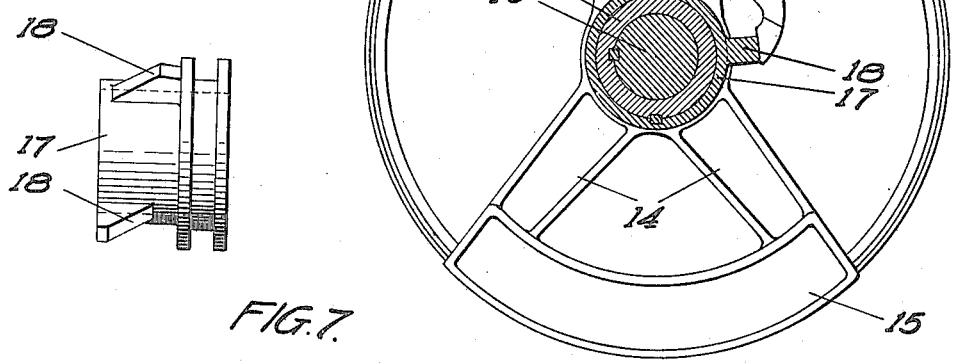

UNITED STATES PATENT OFFICE.

RICHARD RUEMELIN, OF MINNEAPOLIS, MINNESOTA, ASSIGNOR TO MINNEAPOLIS STEEL & MACHINERY COMPANY, OF MINNEAPOLIS, MINNESOTA, A CORPORATION.

TRACTOR.

1,208,381.

Specification of Letters Patent.

Patented Dec. 12, 1916.

Application filed November 9, 1914. Serial No. 871,071.

*To all whom it may concern:*

Be it known that I, RICHARD RUEMELIN, a citizen of the United States, resident of Minneapolis, in the county of Hennepin and State of Minnesota, have invented certain new and useful Improvements in Tractors, of which the following is a specification.

This invention relates to improvements in tractors designed especially for hauling a gang of plows, although applicable for use as a general purpose traction engine.

The invention consists generally in the construction and combinations hereinafter described and particularly pointed out in the claims.

Figure 1:
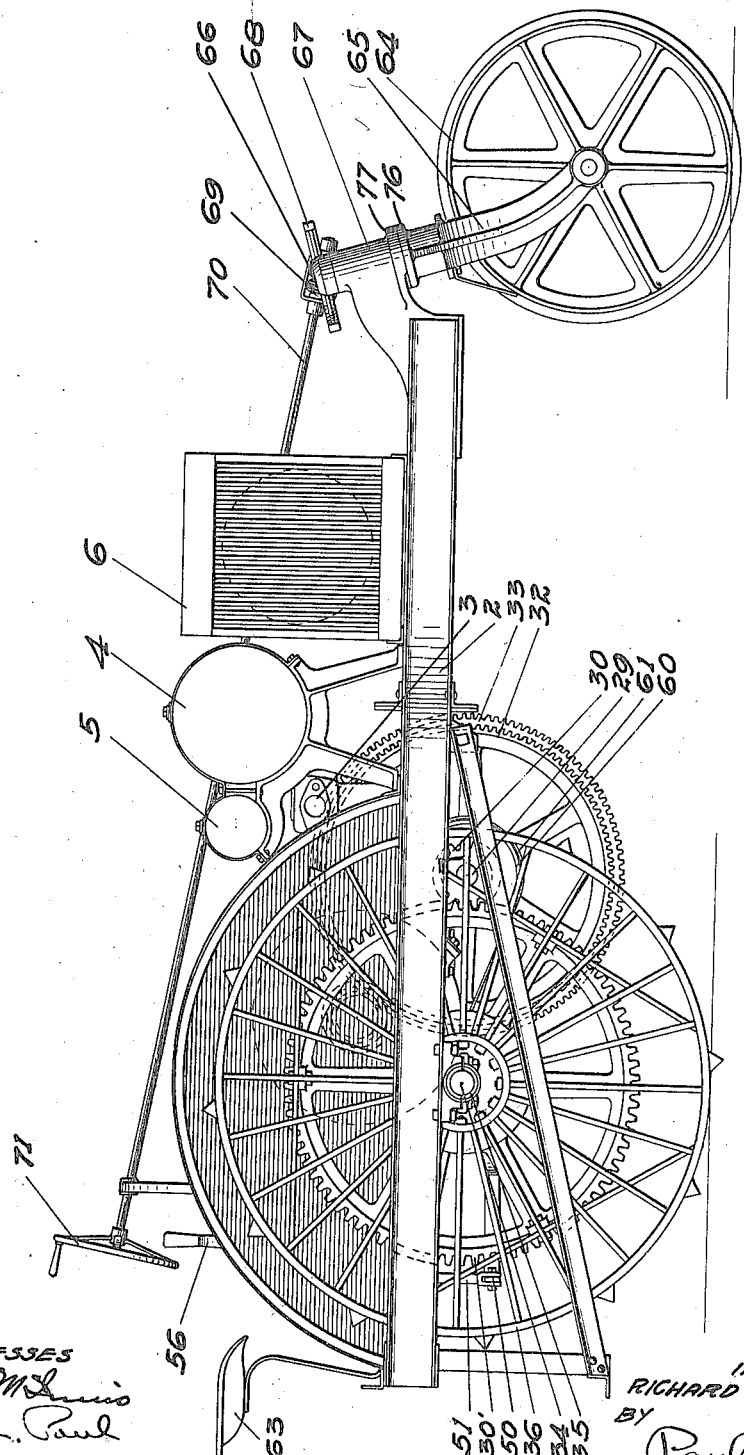
Figure 2:
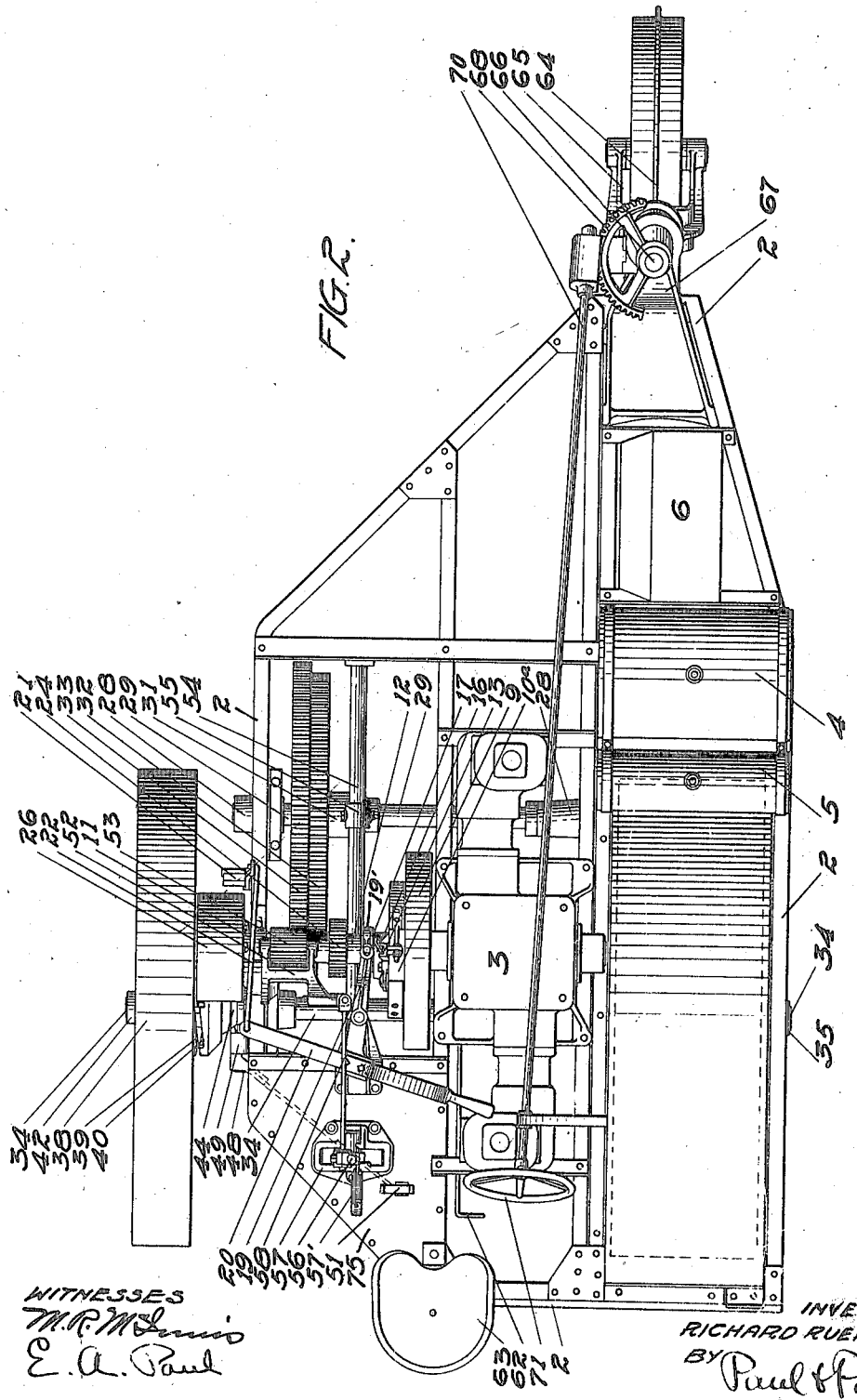
Figure 3:
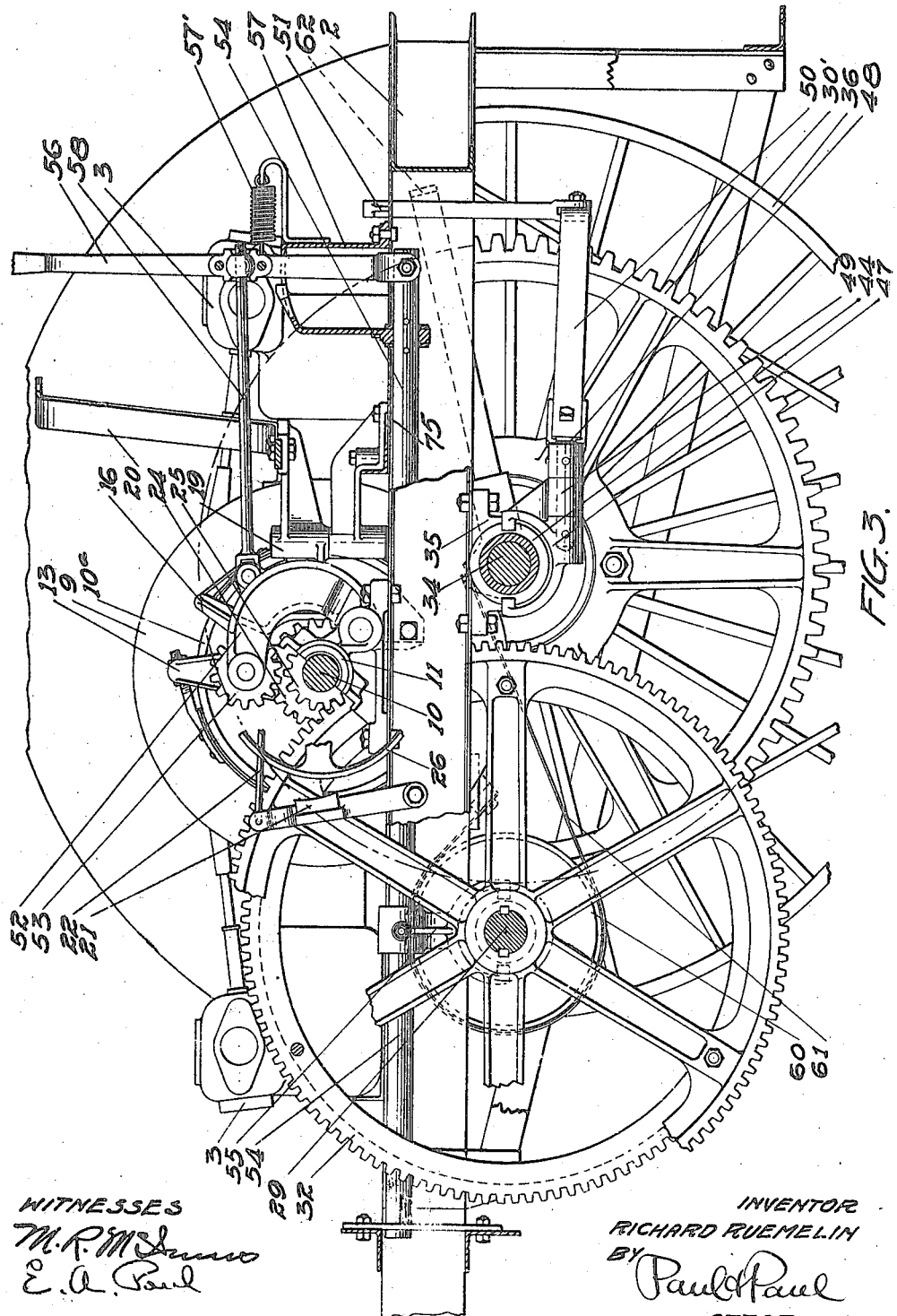
Figure 4:
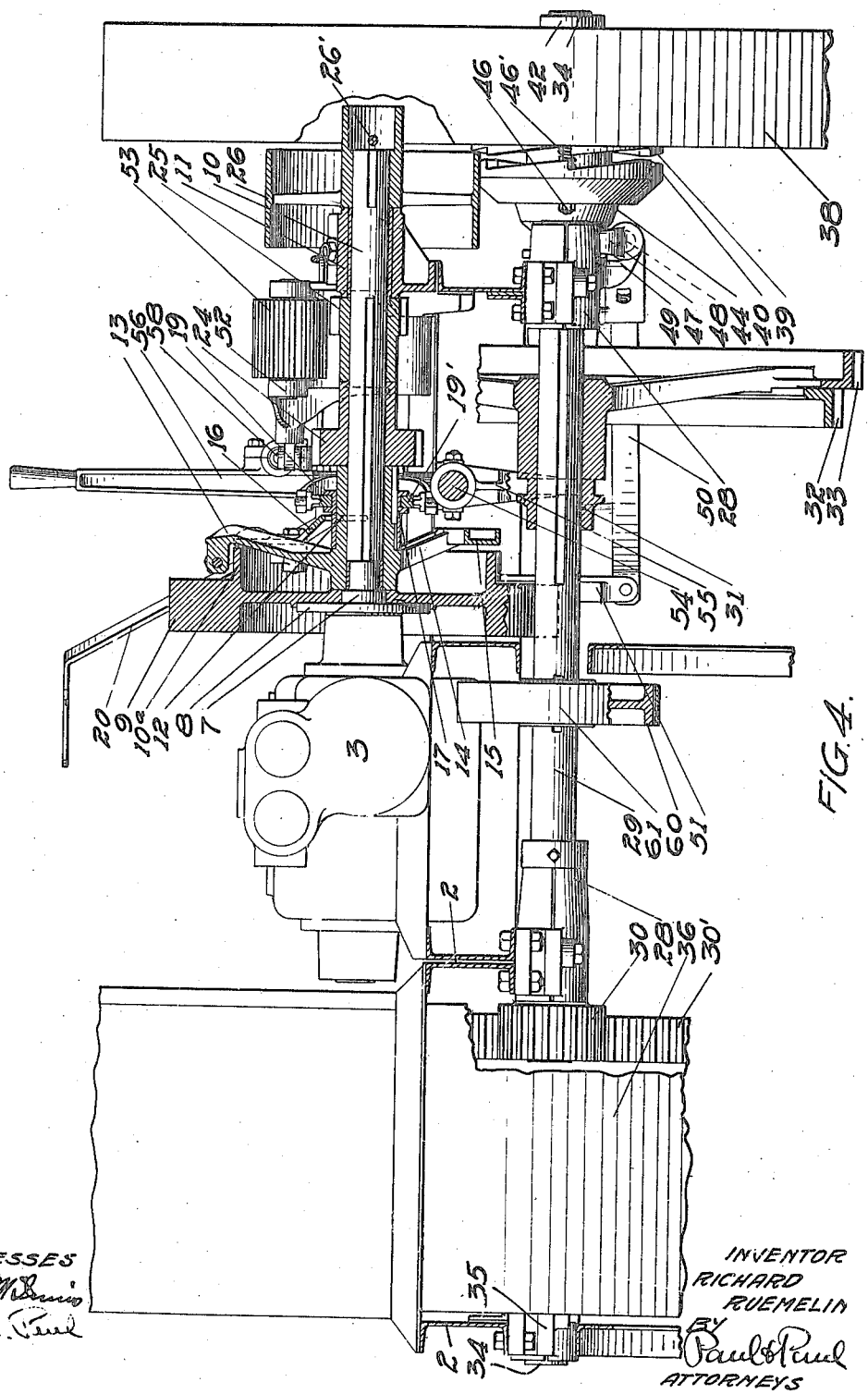

In the accompanying drawings forming part of this specification, Figure 1 is a side elevation of a tractor embodying my invention, Fig. 2 is a plan view of the same, Fig. 3 is a side elevation and partial section of a portion of the driving mechanism, Fig. 4 is a transverse section and partial elevation showing the principal features of the driving mechanism, Fig. 5 is a detail showing the arrangement of the clutch in connection with the auxiliary driving wheel, Fig. 6 is a vertical section on line 6—6 of Fig. 5 looking in the direction of the arrow, Fig. 7 is a detail of the sleeve connected with the main clutch, Fig. 8 is an elevation of the principal members of the main clutch.

In all of the drawings, 2 represents the frame of the machine. This frame is preferably constructed of a series of longitudinal and transverse channel-bars or angle bars. The frame may be of any convenient form. I have shown it of substantially rectangular form pointed at the forward end.

Mounted upon the frame of the machine is a suitable internal combustion engine 3. I also prefer to mount upon the frame suitable fuel tanks 4 and 5 and a radiator 6. These parts may be of any ordinary or preferred construction. I prefer to employ two tanks, one for holding kerosene, and the other for holding gasolene. In starting the engine, gasolene will be employed, and after the engine is under way the gasolene supply may be shut off and the kerosene supply turned on. The engine is provided with a suitable shaft 7 upon which is secured a disk 8, and a fly-wheel 9 is secured in any suitable manner to the disk 8 and shaft 7. The fly-wheel is provided with a projecting ring 10$^a$, and a friction clutch is arranged to engage this ring. A shaft 10 is mounted near one end in a suitable bearing 11 and its opposite end is surrounded by a sleeve 12 into which the end of the engine shaft 7 projects. The end of the shaft 7 thereby forms a support for the end of the shaft 10. The sleeve 12 is keyed to the shaft 10, and it is provided with the outwardly extending arms 13 and 14, the arms being connected by the plate 15 (see Fig. 8). An arm 16 having a forked inner end is pivoted to one side of the arm 13 and the outer end of the arms 13 and 16 support the ends of a flexible strap that passes around the ring 10$^a$ of the fly-wheel 9. A sleeve 17 provided with the oppositely arranged lugs 18 is mounted upon the sleeve 12 and is splined thereto, so as to turn with said sleeve while capable of a sliding motion thereon. A suitable forked lever 19 engages a collar 19' in a circumferential recess in the sleeve 17. The lever 19 is pivoted upon a stationary support upon the frame of the machine and it is provided with an extension to which is secured a lever 20. One end of this lever is provided with a suitable handle and the other end is connected to a brake 21 by a rod 22.

No claim is made in this application to the friction clutch herein shown and described, as the same is shown in my application for Patent No. 859346, filed August 21, 1914.

The shaft 10 has secured thereon pinions 24 and 25. These pinions are of different sizes and they are preferably spaced apart by hubs projecting toward each other and are splined to the shaft. The shaft 10 is also provided with a pulley 26, which may be used for the application of a belt when the machine is to be used for driving purposes generally. The hub of the pulley extends beyond the end of the shaft and has a pin 26' to which a crank can be applied for starting the engine. The brake 21 hereinbefore referred to may be brought against the face of the pulley 26 and this may be done by the same lever that operates the clutch. With this arrangement the brake is moved away from the face of the pulley when the shaft 10 is clutched to the engine shaft. When the shaft 10 is released from the engine shaft the brakes will by the same movement of the lever be brought against the face of the pulley 26, which will cause the shaft 10 to be quickly stopped.

Parallel with the shaft 10 and preferably mounted in bearings 28 upon the frame of the machine and in front of the shaft 10, is a shaft 29. This shaft has at one end a pinion 30 that engages the gear 30' on the main traction wheel. It also has a sleeve or hub 31 keyed to the shaft 29 so as to rotate therewith while being capable of sliding thereon. This hub has secured to it or formed integrally therewith two gears 32 and 33. The hub 31 and the gears 32 and 33 are capable of sliding longitudinally on the shaft 29, but rotate at all times with said shaft.

A main shaft or axle 34 is mounted in bearings 35 secured to the frame of the machine. This axle has at one end a large and wide-faced traction wheel 36, with its hub rigidly secured to said shaft. This wheel has secured to it the large ring gear 30'. The opposite end of the shaft has a traction wheel 38 mounted loosely thereon. The face of this wheel is provided with one member 39 of a ratchet clutch. The other member 40 of said clutch is secured upon the shaft 34 so that it must rotate with said shaft, while at the same time it is capable of sliding longitudinally thereon. The two clutch members have ratchet teeth, with one abrupt and one long incline for each tooth. The details of this clutch as I prefer to use it are shown in Figs. 5 and 6 of the drawings. As here shown the shaft or axle 34 has pinned to it near its ends the two disks 42 and 43. The hub of the wheel 38 is mounted between these two disks. The disk 43 has preferably a pair of lugs 45, and the sliding collar 44 of the clutch member 40, has a pair of recesses to receive said lugs. A number of bolts 46 pass through the disk 43 and are secured in the clutch member 40. These bolts are provided with spiral springs 46' engaging the rear face of the disk 43 and tending to hold the clutch member 40 at all times in engagement with the clutch member 39. A yoke 47 engages the collar 44 of the clutch member 40 and a short rock shaft 48 mounted in a stationary bearing 49 is connected to this yoke. The other end of the rock shaft is connected to a diagonally arranged bar 50 that has its end connected to a foot bar 51, extending upward and arranged in position to be engaged by the foot of the operator of the machine. With this arrangement the clutch members 40 and 39 are normally held in engagement with each other. When, however, it is desired to release the auxiliary traction wheel 38 from the axle 34 the clutch is operated by the means described so as to cause the member 40 to be disengaged from the member 39. This feature of the invention is of great importance. In driving straight ahead the clutch members will be engaged and both wheels will be rigidly connected to the axles and will serve as traction wheels. When it is desired to swing the forward end of the tractor to the right, for example, in turning the machine, the main tractor wheel will remain practically stationary if a short turn is made. The auxiliary tractor wheel 38 which swings around at the end of the axle must then turn faster than the main wheel. It is permitted to do this by the clutch connection between the wheel and the axle as the inclined faces of the ratchet teeth will ride over each other permitting the auxiliary tractor wheel to turn as rapidly as may be necessary. In turning the machine the other way the main tractor wheel must travel much more rapidly than the auxiliary tractor wheel, this last wheel remaining practically stationary when a short turn is made. This could not be accomplished if both wheels were fast upon the axle. With my present construction it is only necessary for the operator to disconnect the clutch members 40 and 39, and the auxiliary wheel 38 will then be permitted to remain practically stationary or to turn as slowly as may be required while the other wheel travels as fast as may be required.

In ordinary traction engines expensive and complicated differential gearings are provided to permit the wheels to travel at different rates of speed when required. By my combination and arrangement of devices I secure this result by the simple mechanism herein described.

I also prefer to provide means by which the machine may be reversed. For this purpose the pinions 24 and 25 on the shaft 10 are arranged sufficiently far apart so that the gears 32 and 33 may be moved into neutral position between said pinions, and without being in engagement with either of them. This neutral position is shown in Fig. 4 of the drawings. I provide a pivoted arm 52 carrying a pinion 53, which is of sufficient width to enable it to engage the pinion 25 and at the same time to engage the gear 33 when the gears 32 and 33 are standing between the pinions 24 and 25. I also provide means for moving the gears 32 and 33, so as to bring the gear 32 into engagement with the pinion 24 and the gear 33 in engagement with the pinion 25. For this purpose a rock shaft 54 is mounted in bearings in the frame of the machine and is provided with a yoke 55 that engages the hub 31 carrying the gears 32 and 33. A lever 56 is pivotally connected to the rock shaft 54 and extends upward through a slotted bearing plate 57. This plate has a transverse slot and a short slot communicating with and at right angles to the transverse slot. A slot of substantially T-form is thereby produced through which the lever 56 extends. A spring 57 engages this lever and tends to hold it in the transverse part of the slot. A rod 58 is connected to the lever and to the arm 52 carrying the reversing pinion 53. When the lever 56 stands in a vertical position the gears 32 and 33 are in a neutral position or between the pinions 24 and 25. By moving the lever into either end of the transverse slot the shaft 54 is rocked and one of the gears 32 or 33 is moved into engagement with the corresponding pinion 24 or 25. If it is desired to reverse the machine the lever 56 is first brought into a vertical position thereby bringing the gears into neutral position. The lever is then pushed forward and caused to enter the longitudinal portion of the slot. This movement through the rod 58 and arm 52, will cause the pinion 53 to engage the pinion 25 and the gear 33. Rotation of the shaft 10 from the engine will now cause the machine to move in a reverse or backward direction. By this means when the lever 56 is standing upright the wheels 32 and 33 are in neutral position, and the machine will remain stationary even though the engine is running. By moving the lever 56 in one direction into the end of the transverse slot in the bearing plate 57, one of the gears 32 or 33 will be moved into mesh with the corresponding pinion 24 or 25 and the machine will be driven at a fast or slow speed depending upon which gear has been brought into engagement with its driving pinion. If it is desired to reverse the travel of the machine the lever 56 must first be brought into an upright or neutral position, thereby disengaging the gear 32 or 33 from the corresponding pinion. This will bring the machine to a stationary position. Then by pushing forward on the lever 56 the same will be brought into the forward extension of the slot in the bearing plate 57, and, in the manner already described, the pinion 53 will be caused to engage the pinion 25, and the gear 33, and the machine will then be driven backward at a slow speed. By this means the operator through a single lever has complete control of the speed and direction of movement of the machine.

I prefer to provide upon the shaft 29 a brake wheel 60 having a friction brake strap 61 surrounding the same with one end rigidly connected to the frame of the machine and the other end connected to a pivoted foot lever 62. The end of this lever extends to a point near the operator's position. By this means the friction brake may be applied whenever desired directly to the driving shaft 29. I also prefer to provide the machine with a suitable driver's seat 63. I also provide the machine with a suitable steering wheel 64, mounted in a yoke 65 that has preferably an inclined shaft 66 extending upward through an inclined bracket 67. This shaft is provided with a gear segment 68 engaged by a worm pinion 69 on a shaft 70. This shaft is supported in suitable bearings and has a hand-wheel 71 arranged in close proximity to the operator's seat 63. By this means the wheel 64 may be turned in either direction for the purpose of guiding the machine. The yoke 65 is provided with a collar 76 at its upper end which bears against the lower preferably circular face 77 of the bracket 67. When the steering wheel 64 and the yoke 65 are turned in either direction the inclined face of the collar 76 will tend to raise the bracket 67. The pressure then exerted by the face 77 of the bracket 67 on the collar 76 tends to turn the yoke 65 and wheel 64 back into normal position standing straight ahead or longitudinally of the machine. This arrangement of the yoke and bracket has a tendency to keep the steering wheel at all times in a straight-ahead position, and to bring it back to this position if it is turned either way. While I consider this an important feature of the invention, I may in some instances employ a steering wheel with a vertical fork instead of the inclined fork herein shown. I also prefer to provide the frame of the machine with a suitable operator's platform 75.

It will be understood that the details of the construction may be varied in many particulars without departing from my invention.

I claim as my invention:

1. The combination, in a machine of the class described, with a frame, of a motor mounted upon said frame, an axle mounted in bearings upon said frame, a main traction wheel rigidly secured to said axle near one end thereof, and provided with a ring gear, an auxiliary traction wheel loosely mounted upon said axle near its opposite end, a ratchet clutch having one member upon said axle and the other upon said auxiliary traction wheel, means for disconnecting said clutch at will, a shaft arranged parallel to said axle and provided with a pinion engaging the ring gear upon the main traction wheel, and means arranged between said last named shaft and the engine for driving said shaft, substantially as described.

2. The combination, in a machine of the class described, with a frame, of a motor mounted upon said frame, an axle mounted in bearings upon said frame, a main traction wheel rigidly secured to said axle near one end thereof, and provided with a ring gear, an auxiliary traction wheel loosely mounted upon said axle near its opposite end, a ratchet clutch having one member upon said axle and the other upon said auxiliary traction wheel, means for disconnecting said clutch at will, a shaft arranged parallel to said axle and provided with a pinion engaging the ring gear upon the main traction wheel, and means arranged between said last named shaft and the engine for driving said shaft at two speeds in a forward direction, and at a single speed in a reverse direction, substantially as described.

In witness whereof, I have hereunto set my hand this 28" day of October 1914.

RICHARD RUEMELIN.

Witnesses:
 GENEVIEVE E. SORENSEN,
 EDWARD A. PAUL.

Copies of this patent may be obtained for five cents each, by addressing the "Commissioner of Patents Washington, D. C."